United States Patent [19]

Zellweger et al.

[11] 4,222,148

[45] Sep. 16, 1980

[54] SPECTACLE HINGE

[75] Inventors: Conrad Zellweger, Chene-Bougeries; Joseph Biondina, Bernex, both of Switzerland

[73] Assignee: La Nationale S.A., Geneve, Switzerland

[21] Appl. No.: 969,330

[22] Filed: Dec. 14, 1978

[30] Foreign Application Priority Data

Dec. 22, 1977 [CH] Switzerland .................. 15856/77

[51] Int. Cl.² ............................................. G02C 5/22
[52] U.S. Cl. .................................. 16/128 A; 351/113
[58] Field of Search ............ 16/128 A; 351/113, 119, 351/121, 114

[56] References Cited

U.S. PATENT DOCUMENTS

| | | | |
|---|---|---|---|
| 3,064,530 | 11/1962 | Vigano | 16/113 X |
| 3,644,023 | 2/1972 | Villani | 16/128 A |
| 3,957,360 | 5/1976 | Villani | 16/128 A |
| 4,084,889 | 4/1978 | Vischer | 16/128 A |

Primary Examiner—George H. Krizmanich
Attorney, Agent, or Firm—Emory L. Groff, Jr.

[57] ABSTRACT

A hinge for spectacles includes two parts, the first of which has a cam profile provided by one face of a strip of generally U-shape, the other part comprising a cam follower button of generally rectangular shape. The first part of the hinge is made of a ductile metal whereas the strip providing the cam profile is made of a material having a greater hardness than the first part of the hinge. A spring urges the cam follower button against the cam profile which has a relatively large surface for supporting the face of the button.

4 Claims, 2 Drawing Figures

SPECTACLE HINGE

Hinges for spectacles are known wherein the hinge comprises two hinge parts, one of which has a profile of a cam, the other hinge part comprising a cam follower button subjected to the action of a spring urging it against the profile of the cam. The hinge part having the profile of a cam is made of a malleable metal. The cam member itself however, has a bearing surface of a hardness greater than that of the hinge part provided with the cam profile.

In known hinges of this type, the part having the bearing surface of greater hardness is connected to the hinge part by engagement in a slot therein, the plane of the slot being substantially perpendicular to the pivoting axis. This type of construction is relatively complicated and costly. In addition, the part of greater hardness engaged in the slot is of relatively slight width and therefor does not provide a large enough support surface for the cam follower button.

The object of the present invention is to provide a spectacle hinge of the foregoing type of simple and economical construction permitting in addition however, a relatively large surface for supporting a cam follower button against the profile of the cam.

To accomplish this purpose, the hinge according to the present invention is characterized in that the connected part comprises a strip, one face of which provides the cam profile and the other face of which conforms substantially to the exterior shape of the hinge part which it encloses.

The attached drawing shows schematically and by way of example a preferred form of execution of the spectacle hinge according to the present invention wherein.

Figure 1:
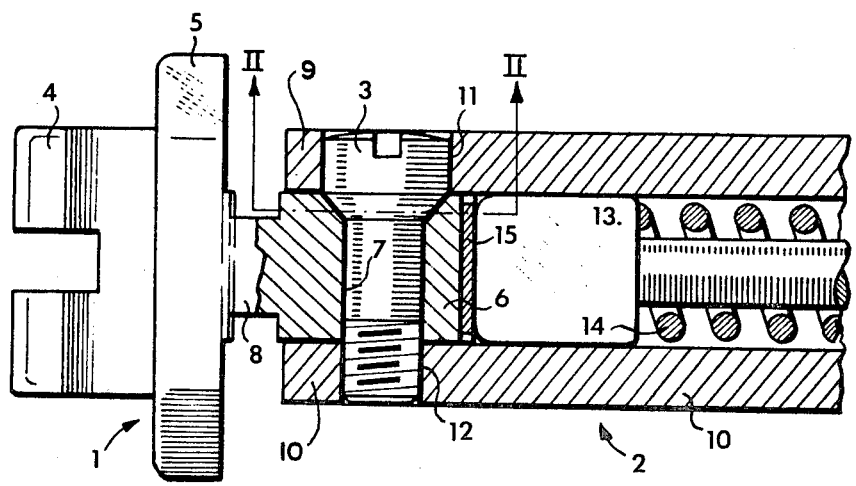
FIG. 1 is a side view, partly in section, parallel to the pivotal axis of the hinge.

The hinge illustrated comprises two parts 1 and 2 connected one to the other by means of a screw 3.

The hinge part 1 includes a tongue portion 4 which is molded into the resin of which the spectacle frame is formed and is integral with a plate portion 5. The plate portion includes a projection 6 having a bore 7 adapted to receive screw 3. Plate portion 5 and projection 6 are connected by means of a reduced neck portion 8 which is deformable in order to adjust the position of the arms 9 and 10 of the hinge part 2 relative to the frame. To permit this adjustment, the hinge part 1 is made of a ductile metal such as silver or brass.

The arms 9 and 10 of the hinge part 2 extend from a hollow portion of a conventional temple member 20 and are disposed on the sides of the projection 6. Arm 9 has a smooth bore 11 to receive the head of screw 3 while arm 10 has a threaded bore to receive the threads of said screw. Between the arms 9 and 10 there is mounted a sliding cam follower button 13 subjected to the action of a spring 14 which urges it in the direction of hinge part 1. This button cooperates with a profile of a cam member formed by a flexible strip 15 carried by the hinge part 1. The strip 15, made of a material of greater hardness than the hinge part 1, is generally U-shaped, the ends of its legs being recurved toward each other as indicated at 16 and 17. These recurved ends are engaged in grooves 18 and 19 which retains strip 15 on projection 6 of hinge part 1.

The projection 6 of hinge part 1 has an outer contour corresponding to the inner profile of the strip 15 engages the projection 6 in a resilient manner. The outer profile of strip 13 provides a cam surface engaged by follower 13.

As can be seen from the drawing, the portion 6 is of generally rectangular shape and the strip 15 presents, in a plane perpendicular to the pivotal axis of the hinge, a corresponding rectangular shape in order to be applied to three sides of the sides of portion 6.

It is evident with reference to FIG. 1 that the strip 15 cannot be displaced parallel to the pivotal axis, since it is retained between the arms 9 and 10 of the hinge part 2. The result is that the recurved ends 16 and 17 are not indispensable and could be eliminated. However, said ends do serve a useful function since they make it easier to retain the strip in position on the hinge part 1 before connection of the two hinge parts by means of the screw 3.

As can be seen from FIG. 1 the width of the strip 15 is less than the thickness of the portion 6 of the hinge part 1. In this way, the two opposite faces of the projection 6 bear against the interior faces of the arms 9 and 10 of the hinge part 2 which permits achieving between the hinge parts 1 and 2 a connection practically free of play.

Figure 2:
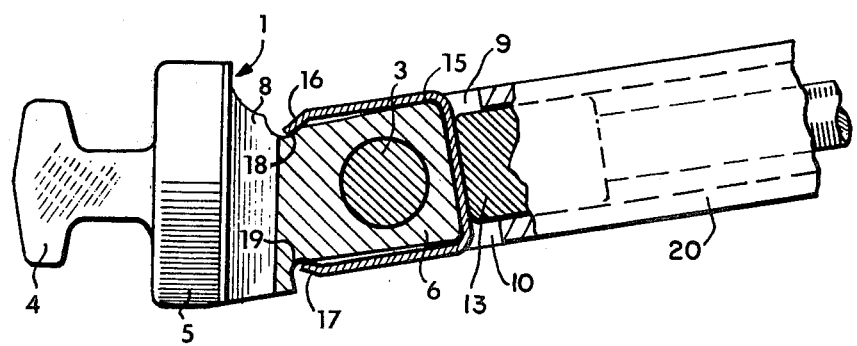
FIG. 2 is a plan view of the hinge shown in FIG. 1 with a partial section taken on the line II—II.

In use, when the temple member is in position for wearing the spectacles, as shown in FIG. 2, the cam follower 13 is being pressed against the end of the cam member 15 by the spring 14, thus yieldingly retaining the temple member in that position. When it is desired to fold the temple member against the frame of the spectacles, the temple member is rotated clockwise, as seen in FIG. 2 causing the follower member 13 to slide along cam member 15 over the corner thereof and into engagement with the side of the cam member. In this position the spring 14 will press the follower 13 against the side of the cam member 15, thus retaining the temple member in a position substantially parallel with the frame of the spectacles. This construction permits a large surface engagement between the cam member and the follower, thus securely holding the temple member in the position to which it is moved.

We claim:

1. A spectacle hinge comprising first and second parts, said first part including a projection and a cam member, the second part comprising a cam follower button, a spring urging said button against the cam member, the first hinge part being made of a ductile metal, the cam member of the first hinge having a hardness greater than that of the first hinge part, said cam member comprising a strip of which the outer face comprises the cam surface and the inner face is of the same shape as the outer surface of the projection of the first hinge part and encloses said projection.

2. A spectacle hinge according to claim 1 wherein, the strip is resilient, said projection enclosed by the strip being of generally rectangular shape in a plane perpendicular to the pivotal axis of the hinge, said strip being of generally U-shape and engaging three sides of said projection.

3. A spectacle hinge according to claim 2 wherein, said projection is formed with grooves, the ends of the strip being recurved toward one another and engaged in said grooves.

4. A spectacle hinge according to claim 3 wherein, the width of the strip is less than the thickness of the projection.

* * * * *